April 28, 1970 S. N. ANDRE ET AL 3,509,465

PRINTED CIRCUIT SPIRAL ANTENNA HAVING AMPLIFIER AND BIAS FEED CIRCUITS INTEGRATED THEREIN

Filed Oct. 22, 1965 2 Sheets-Sheet 1

INVENTORS
STEPHEN N. ANDRE
EDISON M. DAVIS
BY
Spencer E. Olson
ATTORNEY

INVENTORS
STEPHEN N. ANDRE
EDISON M. DAVIS
BY Spencer E. Olson
ATTORNEY

United States Patent Office 3,509,465
Patented Apr. 28, 1970

3,509,465

PRINTED CIRCUIT SPIRAL ANTENNA HAVING AMPLIFIER AND BIAS FEED CIRCUITS INTEGRATED THEREIN

Stephen N. Andre, Tonawanda, and Edison M. Davis, Buffalo, N.Y., assignors to Sylvania Electric Products Inc., a corporation of Delaware Filed Oct. 22, 1965, Ser. No. 501,144
Int. Cl. H04b *1/18*
U.S. Cl. 325—373 14 Claims

ABSTRACT OF THE DISCLOSURE

A tunnel diode amplifier integrated into a printed circuit equiangular spiral antenna in which the antenna elements are used as a portion of the amplifier transmission line and to provide bias source isolation.

This invention relates generally to electromagnetic wave receiving and transmitting systems and more particularly to antenna systems having electronic circuitry integrated into the antenna structure. It is concerned principally, but in its broader aspects not exclusively, with an integrated spiral antenna and tunnel diode amplifier having a planar configuration and capable of operation at high microwave frequencies.

The concept of combining antenna elements and a solid state amplifier, converter, or other active electronic device, into a single unit is of considerable interest where extremely compact and lightweight packaging is essential, such as in aerospace applications; also, this approach is often found to be less expensive than a corresponding conventional system and may even provide improvements in system operation. Examples of previously investigated integrated designs are described in a paper by John R. Copeland and William J. Robertson entitled, "Antennaverters and Antennafiers," published in the 1961 Proceedings National Aerospace Electronics Conference, pp. 171–174, sponsored by the IRE, May 8–10, 1961, Dayton, Ohio. An antenna incorporating active elements is also described by A. F. Wickersham, Jr., et al. in U.S. Patent No. 3,098,973, assigned to the assignee of the present application.

These previous methods of integrating semiconductor circuits with antennas have resulted in units of nonplanar configuration and, as compared to the present invention, are rather bulky and difficult to fabricate. Further, the methods employed to provide direct current (DC) bias to the active circuit device in these prior art integrated structures are incompatible with the integrated design concept and present other significant disadvantages. More specifically, all the known bias circuits require additional components to provide the necessary isolation between the microwave circuit and the DC bias source, and some are limited to narrow band performance and provide relatively poor isolation between the bias source and AC circuit. For example, one commonly used bias circuit requires connection of a choke, or a choke and bypass capacitor, between the bias source and semiconductor device to provide isolation. Another approach is to employ a transmission line filter network comprising a capacitor and length of transmission line to reduce discontinuities, but this provides effective isolation over only a narrow bandwidth. Yet another known technique comprises applying the bias, through a choke, at a voltage null position in the transmission line across which the semiconductor device is connected, but this again imposes narrow bandwidth limitations.

With an awareness of the foregoing limitations and disadvantages of the prior art, applicants have as a general object of the present invention to provide an improved electronic circuit-antenna package of integrated structure.

A primary object of the invention is to provide an easily fabricated amplifier-antenna of planar configuration which is capable of broadband operation at high microwave frequencies.

Another object of the invention is to provide an improved biasing method for electronic devices associated with an antenna.

Another object of the invention is to provide means for biasing an AC circuit integrated into an antenna structure which is compatible with the integrated structure and broadband operation and which provides isolation between the bias supply and AC circuit without requiring additional components.

Still another object of the invention is to provide an integrated tunnel diode amplifier-spiral antenna package of planar configuration which is easily fabricated, light in weight, compact, and capable of broadband operation at high microwave frequencies.

Briefly, the present invention, in its preferred form, comprises a tunnel diode amplifier integrated into a printed circuit equiangular spiral antenna in which the antenna elements are used as a portion of the amplifier transmission line and to provide bias source isolation. A first arm of the antenna is etched on one side of a dielectric sheet and the second arm of the antenna is etched on the other side of the dielectric. A printed center conductor extending from the terminal of the first arm of the antenna and aligned with the second arm forms a transmission line of which the second arm is the ground plane. A pill-type tunnel diode is embedded into and electrically connected across the transmission line, between the center conductor and second arm (ground plane), at a selected distance along the line The center conductor extending between the terminal of the first arm and the diode is shaped and dimensioned as a step-type or tapered impedance transformer to provide an impedance match between the diode circuit and the antenna. An open or short circuited transmission line stub for circuit tuning is provided by appropriate termination of the center conductor, at a selected distance beyond the diode, into an open circuit or a shorting capacitor embedded in the transmission line. A source of voltage is connected across the ends of the spiral antenna arms for biasing the diode to operate as an amplifier, thereby employing the properties of the frequency independent spiral antenna to provide isolation between the bias source and amplifier. A bias resistor is embedded in and across the transmission line within proximately of a voltage null point therein; e.g., next to the shorting capacitor.

Other objects, features and advantages of the invention will become apparent and its construction and operation better understood, from the following detailed description taken in conjunction with the accompanying drawings, in which.

Figure 1:
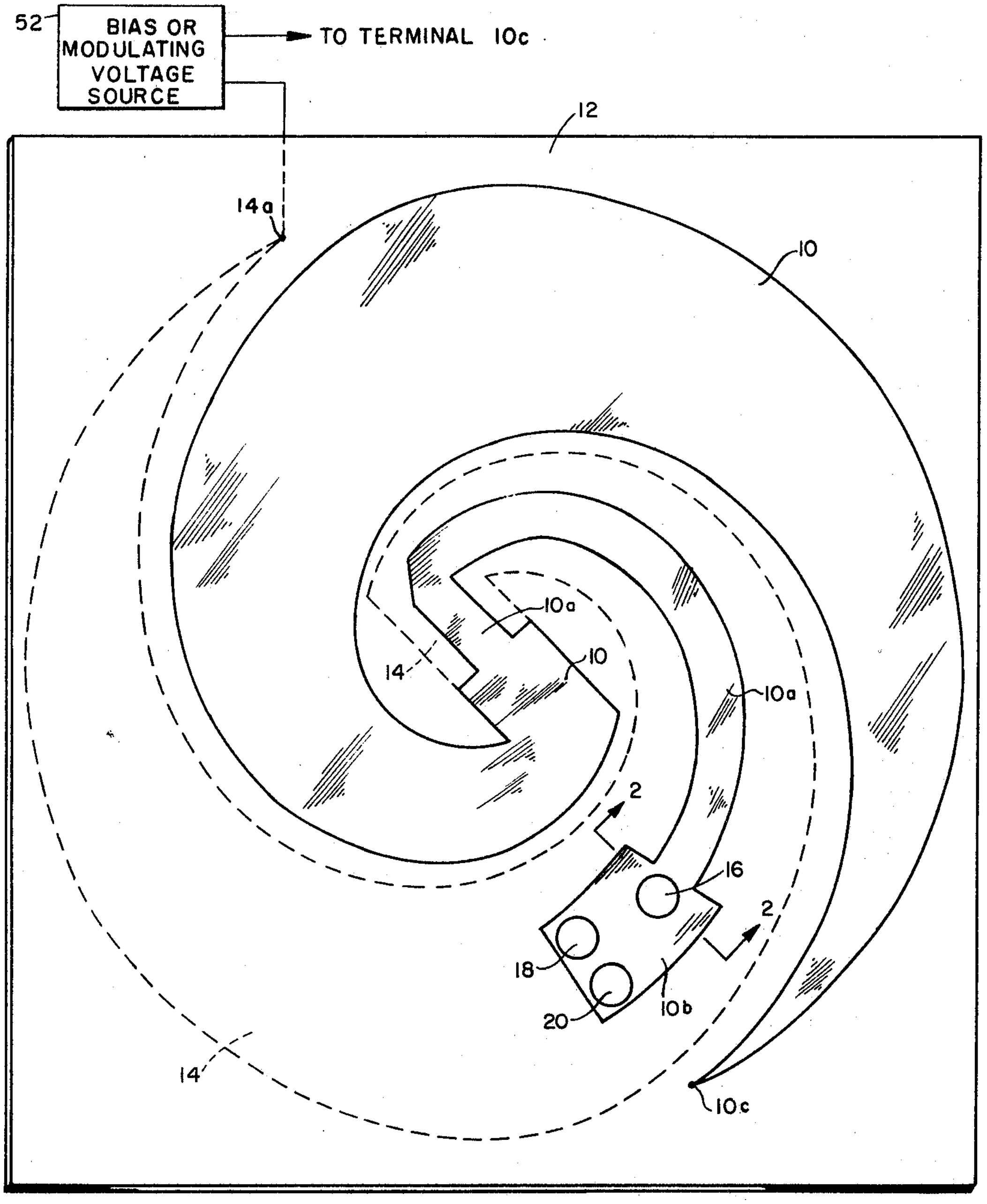
FIG. 1 is a greatly enlarged plan view of a preferred embodiment of a printed circuit amplifier-antenna according to the invention.

Referring now to the drawings, a preferred embodiment of the invention is shown in FIG. 1 as comprising a printed circuit equiangular spiral antenna having a tunnel diode amplifier integral therewith. The equiangular or logarithmic spiral antenna is selected because of its "frequency independent" characteristics and its particular suitability to a planar configuration and broadband microwave operation. A description of this type of antenna appears in a paper by J. D. Dyson published in the IRE Transactions on Antennas and Propagation, April 1959, vol. AP–7, No. 2, pp. 181–187.

The preferred amplifier for this integrated design is a reflection type tunnel diode amplifier which does not require circulators or isolators, thereby keeping package weight to a minimum. Typically, a microwave tunnel diode amplifier comprises a tunnel diode incorporated into a transmission line with input, load, and bias circuits sufficient to assure stability and provide the desired gain. In addition, a tuning circuit is required to cancel the reactive component of the tunnel diode impedance at the center frequency of operation.

Optimum integration of such an amplifier and antenna requires that the amplifier become a part of the antenna itself. Consequently, according to the present invention, a part of the antenna is used as a portion of the amplifier transmission line; more specifically, an unbalanced printed circuit transmission line of the microstrip type is employed wherein one arm, or radiating element, of the spiral antenna functions as the transmission line ground plane. Experimental results show that the ideal of an infinite ground plane is approximated if the ground plane is three times the width of the center conductor. This criterion confines most of the fields within the two conductors. Hence, by etching an appropriately narrow conductor on the opposite side of the dielectric from that on which the antenna arm (ground plane) is etched, an integrated structure is provided whereby the antenna currents radiate while the transmission line currents are confined and do not radiate.

Operation of the amplifier requires that the narrow center conductor of the transmission line be connected to one arm of the antenna. If, as is conventional, both arms, or radiating elements, of the antenna are etched on one side of the dielectric board, a conneciton must be made through the dielectric between the center conductor and opposite arm of the antenna. Such a connection introduces objectionable fabrication problems.

According to the present invention (as shown in FIG. 1), one arm 10 of the spiral antenna is etched on one side of a thin dielectric sheet 12, and the second arm 14 is etched on the other side of the dielectric. A narrow printed circuit center conductor 10*a* extends from the terminal of arm 10 and is aligned with arm 14 so as to form a microstrip transmission line wherein arm 14 functions as a ground plane. A pill-type tunnel diode 16, such as a Sylvania D5061 or a Microwave Associates MA4652A, is embedded into and electrically connected across the transmission line, between the center conductor 10*a* and the ground plane (arm 14), at a selected distance along the line.

Figure 2:
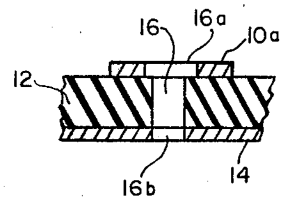
FIG. 2 is a cross-section view taken along line 2—2 of FIG. 1, the vertical dimension being greatly exaggerated for the sake of clarity.

The above-described structure may be more clearly understood by referring to the cross-section view of FIG. 2. A hole is drilled or punched through the sandwich layers of conductor 10*a*, dielectric 12 and conductor 14, which may include a counter-sunk area in conductor 10*a* to accommodate the diode package shape, into which the tunnel diode 16 is inserted. The thickness of the dielectric sheet and the dimensions of the diode are matched so that the end caps 16*a* and 16*b* of the diode, which represent the diode anode and cathode terminals, contact conductors 10*a* and 14, respectively. To assure a good electrical and mechanical connection, the end caps may then be soldered, welded, or fastened in any other acceptable manner to the respective conductors. In one embodiment of the invention which has been fabricated, the sheet of dielectric material is 0.010 inch thick and the diode package is about 0.050 inch in diameter by 1/32 inch long.

Several design constraints and trade-offs must be considered to provide a workable amplifier design. First, the center portion of the antenna must be made small to provide high cutoff; this parameter is discussed in the above-referenced Dyson paper and is related to the wavelength at the operating frequency. Second, the arm of the spiral must be wide enough to provide a suitable ground plane for the microstrip transmission line; to prevent formation of spurious modes, the width of the ground plane should be at least two to three times as wide as the center conductor. Third, the microstrip line must be physically large enough to permit fabrication of the tunnel diode amplifier. Fourth, the impedance of the antenna, the impedance of the transmission line, and the length of the transmission line must provide the proper impedance at the tunnel diode amplifier for stable operation. Finally, the transmission line length is desirably as short as possible to provide maximum bandwidth.

Referring again to FIG. 1, with the above points in mind, it is to be noted that the arrangement of diode 16 and transmission line 10*a* is particularly adapted to a microwave amplifier-antenna in which the diode negative resistance is matched to the antenna impedance. To elaborate, the spiral antenna has an extremely small center structure at microwave frequencies, with the outside diameter of the spiral being in the order of 1.5 inches for the embodiment described below (FIG. 1 is enlarged about 5 times). As a consequence, the amplifier circuit components are necessarily located away from the terminal area at a position on the spiral which is wide enough to accommodate transmission line dimensions commensurate with the size of the components to be embedded therein. The impedance matching aspect may best be illustrated by noting the parameters of an X-band amplifier-antenna of this configuration which has been fabricated on a 0.010 inch dielectric board. In order to have an input impedance of 60 ohms, the narrower portion of center conductor 10*a* has a uniform width selected to provide a 60-ohm transmission line impedance at any point along the line, and the tunnel diode was selected which had a negative resistance of 60 ohms.

Amplifier tuning is provided by a short circuited transmission line tuning stub comprising the wider portion 10*b* of center conductor 10*a* which extends beyond the tunnel diode. This stub is terminated an odd number of quarter wavelengths beyond the diode, at which point a pill-type shorting capacitor 18 is embedded in and electrically connected across the transmission line. The impedance of the stub is a function of the center conductor width, thickness of the dielectric, and dielectric constant of the dielectric. The quarter-wave spacing of the capacitor from the diode reflects the correct inductance to tune the diode. The bias voltage for the tunnel diode amplifier is applied across the transmission line, in a manner to be described hereinafter, and a pill-type bias resistor 20 is embedded in and connected across the transmission line at the voltage null generated by the tuning circuit, or reasonably close thereto, so as to provide low frequency stabilization. In this case the voltage null is at the shorting capacitor 18, and consequently resistor 20 is located adjacent this capacitor. High frequency stabilization is provided by the "frequency independent" spiral antenna (load). The input impedance of such an antenna is a function of its arm width and thickness and for a set of given dimensions, it converges to a reasonably constant value with increasing frequency.

Figure 3:
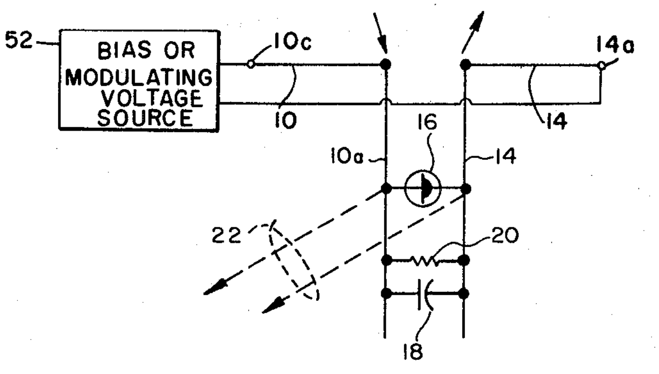
FIG. 3 is an equivalent circuit diagram of the amplifier-antenna shown in FIG. 1.

FIG. 3 represents a lumped constant equivalent circuit of the microwave amplifier-antenna described with reference to FIG. 1, analogous components being labeled with the same reference numbers. If the unit is applied as a pseudo-passive repeater, the received, incident electromagnetic wave energy is reflected from the termination of the transmission line and reradiated by the circularly polarized antenna elements, the reflected power being multiplied by the gain of the amplifier. If the amplifier-antenna is employed as part of a receiver or transmitter, a transmission line 22 connected across the tunnel diode (as indicated by dashed lines in FIG. 3) may be used to interconnect the integrated unit with the balance of the receiver or transmitter circuitry.

Figure 4:
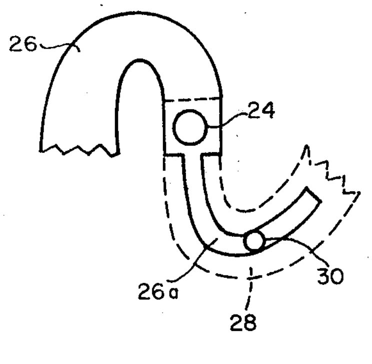
FIG. 4 is a fragmentary plan view of a printed circuit amplifier-antenna according to an alternate configuration of the invention, the diode being connected across the antenna terminals.

At lower frequencies, if the negative resistance of the tunnel diode is compatible with the impedance of the antenna and if the center structure of the antenna allows, the diode may be connected across the terminals of the spiral antenna arms. Such a configuration is shown in FIG. 4, where diode 24 is connected across the terminals of printed circuit antenna arms 26 and 28. A narrow conductor **26*a*, extending from arm 26, provides a transmission line tuning stub, and a bias resistor 30 is embedded in and connected across the transmission line to provide low frequency stability. In this case, tunnel diode 24** may be considered as being embedded in the transmission line with the length of line between the diode and the terminal of antenna arm being zero.

Figure 5:
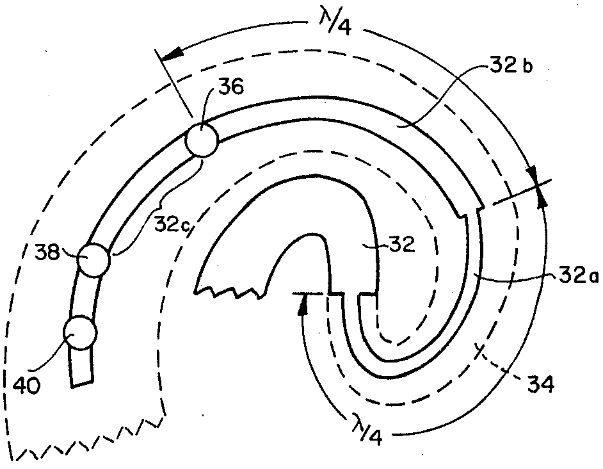
FIG. 5 is a fragmentary plan view of a printed circuit amplifier-antenna according to another alternate configuration of the invention, the antenna feedline including a step transformer; and, FIG. 6 is a fragmentary plan view of a printed circuit amplifier-antenna according to still another alternate configuration of the invention, the antenna feedline including a tapered impedance transformer.
Figure 6:
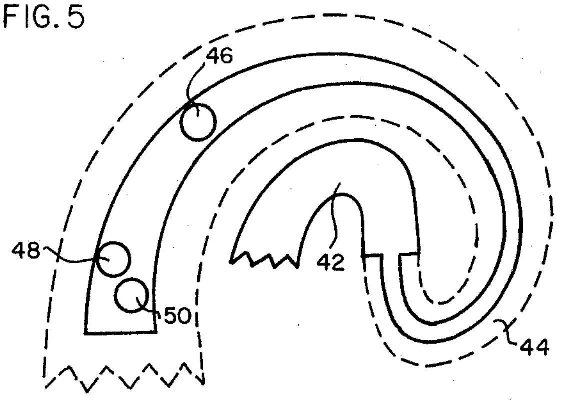

In cases where the antenna impedance is significantly higher or lower than the diode impedance (negative resistance), well known strip transmission line techniques of employing a step-type or tapered impedance transformer can be applied to provide the proper impedance match. FIGS. 5 and 6 each illustrate an amplifier-antenna arrangement similar to FIG. 1 but with an impedance transformer included in the feedline between the antenna terminal and the diode. To illustrate the design of these configurations, the drawings will now be described as embodied in amplifier-antenna units which have been built and operated.

Referring to FIG. 5, arms 32 and 34 of a 70-ohm logarithmic spiral antenna, conforming to the design criteria of the above referenced Dyson paper, are etched on opposite sides of a 0.010 inch "Polyguide" dielectric sheet, the arms being one-half mil copper and the spiral being about 1.5 inches in diameter. A center conductor extends from the terminus of arm 32 and is aligned with arm 34 so as to provide a transmission line; a tunnel diode 36, a 47-pf. capacitor 38 and a 50-ohm resistor 40 are embedded in this transmission line. The particular application for this unit called for pseudo-passive reflector having an operating frequency near 8 gc./sec. To provide a unidirectional antenna pattern, each antenna element is mounted a specified distance from a ground plane or parasitic element. In this instance, due to the proximity of the ground plane the antenna impedance is raised to 85 ohms. The diode 36, mounted one-half wavelength along the transmission line from the center of the antenna, has a negative resistance of 60 ohms. Hence, a quarter wave step transformer is included between the antenna terminal and the diode to reduce the 85-ohm antenna input impedance to 60 ohms at the position of the diode. The terminus of antenna arm 32 is 0.026λ in width, and center conductor portions **32*a* and 32*b* are 85-ohm line and 60-ohm line respectively. A shorted stub comprising center conductor portion 32*c* and capacitor 38 tunes out both diode capacitive susceptance and a small inductive susceptance which appears at the diode due to the antenna and matching stub. The length of stub 10*c* is 0.129λ, and the bias resistor 41 is mounted 0.062λ beyond the capacitor 38**. The gain of the unit may be varied by changing the impedance of the matching stub. The amplifiers so constructed were found to be capable of up to 35 db gain, with a 20 db or greater gain over a bandwidth of 400 mc.

FIG. 6 illustrates a configuration used for an X-band antenna which includes arms 42 and 44 secured to opposite sides of a dielectric sheet. The high frequency of operation requires a spiral of fine structure, while the low impedance of the amplifier requires a relatively broad transmission line. In order to satisfy both conditions, the amplifier components, tunnel diode 46, capacitor 48 and resistor 50, are placed further out on the spiral and a thin dielectric (0.010 inch thick) is used to minimize the transmission line width. The transmission line is tapered into the higher inpedance center fine structure of the antenna. The transmission line length in this instance is greater than two wavelengths, a tapered line impedance transformer being more convenient than a stepped line in this circumstance.

Returning again to FIGS. 1 and 3, in order to provide direct current bias or modulation to the amplifier of this integrated unit and yet overcome the isolation, narrowband operation and complex construction problems of prior art techniques, the properties of the frequency independent antenna are utilized. This class of antennas is described in a paper by V. H. Rumsey entitled, "Frequency Independent Antennas," published in the 1957 IRE National Convention Record, pt. 1, pp. 114–118. The various portions of this type of antenna are resonant at different frequencies, and by connecting the source of bias voltage to a portion of the antenna which is resonant below the active microwave band of operation, isolation of the bias and microwave circuits is obtained. In the case of the frequency independent spiral antenna, a source of bias or modulating voltage 52, is connected across the ends **10*c* and 14*a* of antenna arms 10 and 14, respectively. That is, tunnel diode 16 is biased by a voltage source connected across the transmission line 10*a*/14** and fed through the spiral arms of the antenna. The outer extremities of the spiral are resonant at a low frequency, $f_1$, and any change of impedance (discontinuity) at the ends of the spiral due to the bias connections is greatly reduced at the spiral input, which is resonant at a higher microwave frequency, $f_2$. Further, the arm length of the spiral is sufficiently long that most of the energy (fed to the spiral input at $f_2$) is radiated before the discontinuity at the end of the arm is reached. Any energy reflected at the end of the arm is then radiated with an opposite polarization sense and results in an ellipticity to the antenna polarization. It is possible to get a rough measure of the reflection by the ellipticity of the antenna polarization. For example, if the ellipticity is 2 db, the reflection back at the antenna terminals is down 30 db from the input. This circuit is as broadband as the performance of the antenna.

Thus, by feeding the bias in through the ends of the antenna arms, thereby utilizing the resonant properties of a frequency independent antenna, the generation of standing waves and other discontinuities due to the bias source is minimized and amplifier stability is maintained. The technique is compatible with the integrated printed circuit amplifier-antenna package. All bias leads can be imprinted along with the antenna, and isolation is achieved without the use of auxiliary networks.

It will be apparent from the foregoing that the present invention provides an integrated amplifier-antenna package which is completely planar, permits operation at microwave and higher frequencies, and is easily fabricated in a compact package of minimum size. It will be understood, however, that the invention is applicable to many types of integrated electronic circuit-antenna packages. The active circuit may comprise one or more tunnel diodes, conventional diodes, or transistors operating as amplifiers, mixers, detectors, or oscillators. When used in an amplifier configuration, the gain enhanced antenna elements may be arranged in a scattering array for space communications or employed in a terrestial microwave communications relay. The approach may also be used to advantage with receiver and transmitter units, where a part of the receiver or transmitter circuitry is integrated into the antenna.

Thus, although there has been described what are now considered to be preferred embodiments of the invention, modifications falling within the scope and spirit of the invention will occur to those skilled in the art. For example, antenna types other than the equiangular spiral may be employed; the dielectric sheet may be a thin film; and, the antenna elements may be etched, vacuum deposited, bonded or otherwise secured to the dielectric. It is intended, therefore, that the invention not be limited by what has been specifically illustrated and described, except as such limitations appear in the appended claims.

What is claimed is:

1. An integrated electronic circuit-antenna package comprising, a sheet of dielectric material, an antenna including a first radiating element secured on one side of said dielectric sheet and a second radiating element secured on the other side of said dielectric sheet, a strip conductor on said sheet extending from said first radiating element and aligned with said second radiating element so as to form a transmission line wherein said strip conductor functions as the center conductor and said second radiating element functions as the ground plane, and at least one electronic circuit component embedded in said transmission line and having a first terminal electrically connected to said strip conductor and a second terminal electrically connected to said second radiating element.

2. An integrated package in accordance with claim 1 wherein said antenna is of the frequency independent class of antennas and wherein a source of bias voltage is connected to said electronic circuit component via said said first and second radiating elements, the input point on each of said elements to which said bias is connected being located at a point of the element which is resonant below the operating frequency of said electronic circuit component to thereby provide isolation between said bias source and said circuit component.

3. An integrated package in accordance with claim 1 wherein said antenna is an equiangular spiral antenna, said first and second radiating elements are the first and second arms, respectively, of said spiral antenna and said strip conductor extends from the terminal of said first arm, and wherein said electronic circuit component is a semiconductor device.

4. An integrated package in accordance with claim 3 wherein a source of voltage is connected across the ends of said first and second arms for biasing said semiconductor device, said arms thereby providing isolation between said bias source and said semiconductor device during operation.

5. An integrated amplifier-antenna of planar configuration comprising, a sheet of dielectric material, a printed circuit spiral antenna having a first arm etched on one side of said dielectric sheet and a second arm etched on the the other side of said dielectric sheet, a printed circuit center conductor extending from the terminal of said first arm and aligned with said second arm so as to form a transmission line wherein said second arm functions as the ground plane, and a tunnel diode embedded in and electrically connected across said transmission line, between said center conductor and said second arm.

6. An amplifier-antenna in accordance with claim 5 wherein a source of voltage is connected across the ends of said first and second arms for biasing said tunnel diode to operate as an amplifier in said transmission line, said arms thereby providing isolation between said bias source and said amplifier.

7. An amplifier-antenna in accordance with claim 6 wherein said voltage source is amplitude modulated so as to amplitude modulate the gain of said tunnel diode amplifier.

8. An amplifier-antenna in accordance with claim 5 including means for biasing said tunnel diode to operate as an amplifier, and wherein the length of said center conductor is terminated so as to provide an open circuited transmission line tuning stub for said tunnel diode amplifier.

9. An amplifier-antenna in accordance with claim 5 including means for biasing said tunnel diode to operate as an amplifier, and further including a capacitor embedded in and connected across said transmission line at a distance beyond said tunnel diode operative to provide a short-circuited transmission line tuning stub for said tunnel diode amplifier.

10. An amplifier-antenna in accordance with claim 5 including means for biasing said tunnel diode to operate as an amplifier, and wherein said diode is electrically connected across the terminals of the first and second arms of said antenna.

11. An amplifier-antenna in accordance with claim 5 including means for biasing said tunnel diode to operate as an amplifier, and wherein said center conductor extending between said first arm terminal and said diode is shaped and dimensioned to provide an impedance match between said tunnel diode amplifier and said antenna at a given operating frequency.

12. An amplifier-antenna in accordance with claim 11 wherein the center conductor extending between said first arm terminal and said diode is shaped as a step transformer.

13. An amplifier-antenna in accordance with claim 11 wherein the center conductor extending between said first arm terminal and said diode is a tapered impedance transformer.

14. A planar amplifier-antenna comprising, a sheet of dielectric material, a printed circuit equiangular spiral antenna having a first arm etched on one side of said dielectric sheet and a second arm etched on the other side of said dielectric sheet, a printed circuit center conductor extending from the terminal of said first arm and aligned with said second arm so as to form a transmission line wherein said second arm functions as the ground plane, a tunnel diode embedded in and electrically connected across said transmission line, between said center conductor and said second arm, a source of voltage connected across the ends of said first and second arms for biasing said tunnel diode to operate as an amplifier in said transmission line, said arms providing isolation between said bias source and said amplifier, the center conductor extending between said first arm terminal and said diode being shaped and dimensioned as a step-type impedance transformer to provide an impedance match between said tunnel diode amplifier and said antenna at a given operating frequency, a capacitor embedded in and connected across said transmission line at a distance beyond said tunnel diode operative to provide a short circuited transmission line tuning stub for said tunnel diode amplifier, and a bias resistor embedded in and connected across said transmission line proximate a voltage null point in said line.

References Cited

UNITED STATES PATENTS

| | | | |
|---|---|---|---|
| 2,958,081 | 10/1960 | Dyson | 343—895 |
| 3,246,245 | 4/1966 | Turner | 325—449 |

KATHLEEN H. CLAFFY, Primary Examiner

R. S. BELL, Assistant Examiner

U.S. Cl. X.R.

325—386, 449; 330—34; 343—792.5, 908